(12) United States Patent
Cusin et al.

(10) Patent No.: US 12,007,716 B2
(45) Date of Patent: Jun. 11, 2024

(54) FLEXIBLE TIMEPIECE COMPONENT AND HOROLOGICAL MOVEMENT INCLUDING SUCH A COMPONENT

(71) Applicant: The Swatch Group Research and Development Ltd, Marin (CH)

(72) Inventors: Pierre Cusin, Villars-Burquin (CH); Christian Charbon, Chézard-St-Martin (CH); Alexandre Haemmerli, Neuchâtel (CH); Lionel Paratte, Marin-Epagnier (CH); Matthias Imboden, St-Blaise (CH)

(73) Assignee: The Swatch Group Research and Development Ltd, Marin (CH)

( * ) Notice: Subject to any disclaimer, the term of this patent is extended or adjusted under 35 U.S.C. 154(b) by 718 days.

(21) Appl. No.: 17/102,793

(22) Filed: Nov. 24, 2020

(65) Prior Publication Data

US 2021/0191322 A1 Jun. 24, 2021

(30) Foreign Application Priority Data

Dec. 20, 2019 (EP) .................................... 19218863

(51) Int. Cl.
*G04B 1/14* (2006.01)
*F16F 1/02* (2006.01)
(Continued)

(52) U.S. Cl.
CPC .............. *G04B 1/145* (2013.01); *F16F 1/021* (2013.01); *F16F 1/10* (2013.01); *G04B 17/06* (2013.01);
(Continued)

(58) Field of Classification Search
CPC ......... G04B 1/145; G04B 17/06; F16F 1/021; F16F 1/10; F16F 2224/0208; F16F 2228/007
See application file for complete search history.

(56) References Cited

U.S. PATENT DOCUMENTS

| 2,662,612 A | 12/1953 | Van Valkenburgh |
| 2014/0080378 A1* | 3/2014 | Wasynczuk ............. C23C 18/54 442/379 |

(Continued)

FOREIGN PATENT DOCUMENTS

| CN | 107698937 A | 2/2018 |
| CN | 109716245 A | 5/2019 |

(Continued)

OTHER PUBLICATIONS

European Search Report for EP 19 21 8863 dated Jun. 15, 2020.
(Continued)

*Primary Examiner* — Edwin A. Leon
*Assistant Examiner* — Kevin Andrew Johnston
(74) *Attorney, Agent, or Firm* — Sughrue Mion, PLLC

(57) ABSTRACT

A flexible timepiece component, in particular for an oscillator mechanism or for a barrel of a horological movement, the component extending along a main plane (P) and including at least a part made of a composite material (1), the composite material (1) including a matrix (2) and a multitude of nanowires (3) distributed in the matrix (2), the nanowires (3) being juxtaposed, the matrix (2) including a material (4) for filling the interstices between the nanowires (3) to join them to each other, each nanowire (3) forming a solid one-piece tube, the nanowires (3) being disposed substantially parallel to an axis (A) substantially perpendicular to the main plane (P) of the component (6, 7).

12 Claims, 1 Drawing Sheet

(51) Int. Cl.
    *F16F 1/10*     (2006.01)
    *G04B 17/06*     (2006.01)

(52) U.S. Cl.
    CPC . *F16F 2224/0208* (2013.01); *F16F 2228/007* (2013.01)

(56) References Cited

U.S. PATENT DOCUMENTS

2018/0327919 A1* 11/2018 Kim .................... F16F 1/06
2019/0212702 A1* 7/2019 Semon ................ G04B 17/066

FOREIGN PATENT DOCUMENTS

| | | | | |
|---|---|---|---|---|
| JP | 2007-533973 | A | | 11/2007 |
| JP | 2018-193607 | A | | 12/2018 |
| JP | 2019-518965 | A | | 7/2019 |
| WO | 2014/006172 | A1 | | 1/2014 |
| WO | 2017/096094 | A1 | | 6/2017 |
| WO | WO-2017191415 | A1 | * 11/2017 | ............. C01B 32/16 |
| WO | 2017/220672 | A1 | | 12/2017 |

OTHER PUBLICATIONS

Communication dated Nov. 2, 2021 from the Japanese Patent Office in Application No. 2020-197923.
Communication dated Dec. 7, 2021 in the Chinese Application No. 202011509869.0.

* cited by examiner

FLEXIBLE TIMEPIECE COMPONENT AND HOROLOGICAL MOVEMENT INCLUDING SUCH A COMPONENT

CROSS REFERENCE TO RELATED APPLICATION

This application claims priority to European Patent Application No. 19218863.9 filed Dec. 20, 2019, the entire contents of which are incorporated herein by reference.

FIELD OF THE INVENTION

The present invention relates to timepiece components, in particular for an oscillator mechanism or for the barrel of a horological movement.

The invention also relates to a horological movement including such a component.

BACKGROUND OF THE INVENTION

Mechanical horological movements generally comprise a barrel, an escapement mechanism and a mechanical oscillator mechanism. The barrel comprises a spring to supply energy to the oscillator mechanism. The escapement mechanism includes, in particular, an anchor and an escapement wheel, while the oscillator mechanism generally comprises a spiral spring associated with an oscillating inertial mass called a balance.

Technical progress in composite materials allows some components from innovative and high-performance materials to be manufactured, which allow, at least partly, purely metallic materials not to be used. Today, an attempt is made to use, for example, carbon nanotubes to manufacture components. Such materials provide advantages in terms of lightness, strength, and simplicity of manufacture. Thus, document JP2008116205A describes a spiral spring comprising a matrix of graphite and amorphous carbon, reinforced by carbon nanotubes which are dispersed in the matrix and aligned in the longitudinal direction of the spiral, that is to say in the direction of the main elastic stresses.

In the publication by N. Hutchison and al (MEMS 2009), a composite material is formed, on the one hand, of a forest of vertically aligned carbon nanotubes (VACNT), and on the other hand, of a second filling material between the nanotubes, mainly carbon, secondarily silicon, or even silicon nitride. The filling material mainly determines the mechanical properties of the composite material.

Nevertheless, these materials are limited to the use of nanotubes, which are usually empty. However, it is not always easy to manufacture nanotubes from materials other than carbon.

SUMMARY OF THE INVENTION

A purpose of the invention is, consequently, to provide a timepiece component which avoids the aforementioned problems.

To this end, the invention relates to a flexible timepiece component, in particular for an oscillator mechanism or for a barrel of a horological movement, the component extending along a main plane (P) and including at least a part made of a composite material.

The component is remarkable in that the composite material comprises a matrix and a multitude of nanowires distributed in the matrix, the nanowires being juxtaposed, the matrix including a material for filling the interstices between the nanowires to join them to each other, each nanowire forming a solid one-piece tube.

Thus, thanks to such a composite material, solid one-piece nanowires are obtained, so that all kinds of materials can be used to manufacture these nanowires. In addition, it is possible to manufacture nanowires easily, in a simpler manner than nanotubes made of some materials. Consequently, it is possible to produce some elements of a horological movement, which must be able to flex, such as a spiral spring or a barrel spring.

According to an advantageous embodiment, the nanowires are disposed substantially parallel to an axis substantially perpendicular to the plane of the component.

According to an advantageous embodiment, the nanowires are made of an element to be selected from the following list: gold, palladium, silicon, poly-crystalline diamond, boron nitride, gallium nitride, silicon nitride, zinc oxide, gallium arsenide, tungsten sulphide, silver, copper, manganese arsenide, indium arsenide, nickel, platinum, germanium, cobalt-graphene, phosphorus-germanium, copper-silver, gold-silver alloys, phosphorus-indium, nitrogen-gallium, nitrogen-indium-gallium, nitrogen-arsenic-gallium, arsenic-gallium, phosphorus-indium-gallium, sulphur-cadmium, sulphur-cadmium-selenium, nitrogen-aluminium-gallium, caesium-lead, antimony telluride, bismuth telluride, silicon oxide, titanium oxide, tungsten oxide, indium oxide, aluminium oxide, magnesium oxide, tin oxide, zinc oxide, lithium niobate, manganese oxide compounds, inorganic compounds such as $Li_2Mo_6Se_6$ or $Mo_6S_{9-x}I_x$. It is also possible to produce nanowires from an amorphous or partially amorphous metal alloy.

According to an advantageous embodiment, the nanowires have a diameter comprised within a range from 1 to 50 nm, preferably within a range from 3 to 15 nm, or even from 5 to 10 nm.

According to an advantageous embodiment, the nanowires have a length comprised within a range from 100 to 500 microns, preferably within a range from 100 to 300 microns, or even from 150 to 200 microns.

According to an advantageous embodiment, the filling material is produced from an element to be selected from the following list: tungsten, organic materials such as parylene, hexagonal boron nitride, poly-crystalline ruby of the $Al_2O_3$ type, diamond, tungsten or molybdenum disulphides, graphite, lead, silicon carbide, nickel, indium phosphide, titanium oxide, poly-silicone, amorphous carbon, amorphous carbon of the DLC (Diamond-like-carbon) type, hafnium oxide, silicon oxide, poly-crystalline silicon, strontium titanate, zinc oxide, indium oxide, tungsten oxide, niobium oxide, cadmium oxide, magnesium fluoride, titanium nitride, silicon nitride, aluminium nitride, gallium nitride, hafnium nitride, calcium nitride, silver nitride, oxidised silicon nitride, platinum, palladium, molybdenum, tantalum, zinc sulphide, molybdenum sulphide, germanium, hydrofluorocarbon, compounds of the AlP, AlN, AlGaSb, AlGaAs, AlGaInP, AlGaN, AlGaP, GaSb, GaAsP, GaAs, GaN, GaP, InAlAs, InAlP, InSb, InGaSb, InGaN, GaInAlAs, GaInAlN, GaInAsN, GaInAsP, GaInAs, GaInP, InN, InP, InAs, InAsSb, ZnSe, HgCdTe, GeSbTe type.

According to an advantageous embodiment, the component is a spiral spring of an oscillator mechanism.

According to an advantageous embodiment, the component is a barrel spring.

According to an advantageous embodiment, the component is an anti-shock device.

The invention also relates to a horological movement comprising a flexible timepiece component according to the invention.

BRIEF DESCRIPTION OF THE DRAWINGS

Other features and advantages of the present invention will become apparent upon reading several embodiments given only by way of non-limiting examples, with reference to the appended drawings wherein.

DETAILED DESCRIPTION OF PREFERRED EMBODIMENTS

The description presents components for a horological movement. The component is a flexible component to be selected from a list comprising, for example, an oscillator mechanism spiral spring or a barrel spring.

Figure 1:
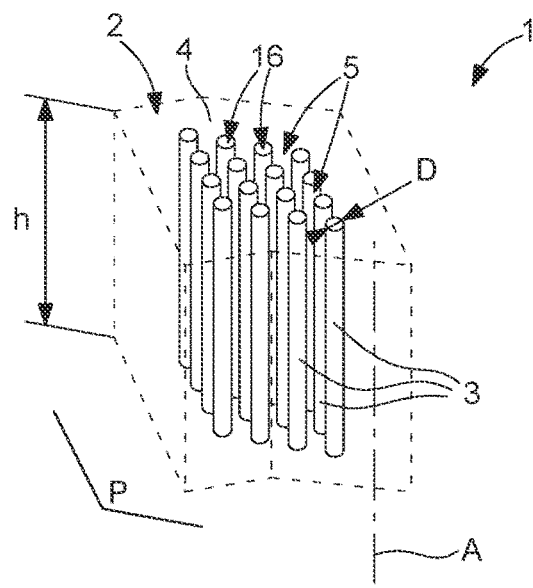
FIG. 1 schematically shows a through perspective view of a composite material according to the invention.

The flexible component is preferably flat and extends along a main plane P. The component includes at least a part made of a composite material 1, shown in FIG. 1. Preferably, the component is entirely made of this composite material 1. Thus, the components of the preceding list can be made of this composite material 1.

The composite material 1 comprises a filling matrix 2 and a multitude of nanowires 3 distributed in said matrix 2. The matrix 2, for example, has a generally flat shape extending in a plane A.

The nanowires 3 form a structure of the composite material 1, wherein they are juxtaposed. They are regularly distributed so as to be homogeneously spaced from one another in the matrix 2. The term "nanowires" means one-piece tubes which are generally solid. Thus, the interior 16 of the nanowires 3 comprises the same material as the outer sheath.

The nanowires 3 are preferably disposed substantially parallel to one another. They are substantially perpendicular to the main plane P of the component. They are disposed substantially parallel to an axis A, perpendicular to the main plane P of the component. Substantially parallel means that the wires are oriented substantially in the same direction.

Advantageously, the composite material is produced in such a way that nanowires 3 are present throughout the mass of the matrix 2.

The nanowires 3 have, for example, a diameter D comprised within a range from 2 to 50 nm. Preferably, the nanowires 3 have a diameter comprised within a range from 3 to 15 nm, or even from 5 to 10 nm.

The nanowires 3 can have a length L comprised within a range from 100 to 500 microns. Preferably, the nanowires 3 have a length comprised within a range from 100 to 300 microns, or even from 150 to 200 microns.

The nanowires 3 are made of a material to be selected from the following list: gold, palladium, silicon, diamond, boron nitride, gallium nitride, silicon nitride, zinc oxide, gallium arsenide, tungsten sulphide, silver, copper, manganese arsenide, indium arsenide, nickel, platinum, germanium, cobalt-graphene, phosphorus-germanium, copper-silver, gold-silver alloys, phosphorus-indium, nitrogen-gallium, nitrogen-indium-gallium, nitrogen-arsenic-gallium, arsenic-gallium, phosphorus-indium-gallium, sulphur-cadmium, sulphur-cadmium-selenium, nitrogen-aluminium-gallium, caesium-lead, antimony telluride, bismuth telluride, silicon oxide, titanium oxide, tungsten oxide, indium oxide, aluminium oxide, magnesium oxide, tin oxide, zinc oxide, lithium niobate, manganese oxide compounds, inorganic compounds of the $Li_2Mo_6Se_6$ or $Mo_6S_{9-x}I_x$ type. It is also possible to produce nanowires from an amorphous or partially amorphous metal alloy. This list is not exhaustive, other materials are also possible.

The matrix 2 includes a filling material 4 for filling the interstices 5 between the nanowires 3. The filling material 4 can advantageously include the nanowires 3, by being injected into the interstices 5 between the nanowires 3. This material 4 mainly determines the mechanical properties of the composite material 1, in particular to make the flexible matrix 2.

The filling material 4 composing the matrix 2 is made of an element from the following list: tungsten, organic materials such as parylene, hexagonal boron nitride, poly-crystalline ruby of the $Al_2O_3$ type, poly-crystalline diamond, tungsten or molybdenum disulphides, graphite, lead, silicon carbide, nickel, indium phosphide, titanium oxide, polysilicone, amorphous carbon, amorphous carbon of the DLC (Diamond-like-carbon) type, hafnium oxide, silicon oxide, poly-crystalline silicon, strontium titanate, zinc oxide, indium oxide, tungsten oxide, niobium oxide, cadmium oxide, magnesium fluoride, titanium nitride, silicon nitride, aluminium nitride, gallium nitride, hafnium nitride, calcium nitride, silver nitride, oxidised silicon nitride, platinum, palladium, molybdenum, tantalum, zinc sulphide, molybdenum sulphide, germanium, hydrofluorocarbon, compounds of the AlP, AlN, AlGaSb, AlGaAs, AlGaInP, AlGaN, AlGaP, GaSb, GaAsP, GaAs, GaN, GaP, InAlAs, InAlP, InSb, InGaSb, InGaN, GaInAlAs, GaInAlN, GaInAsN, GaInAsP, GaInAs, GaInP, InN, InP, InAs, InAsSb, ZnSe, HgCdTe, GeSbTe type. The filling material 4 can advantageously also consist of carbon. This list is not exhaustive, other materials are also possible.

The filling material 4 is flexible, the material 4 having mechanical properties allowing an elastic deformation of the component. The flexibility is further achieved thanks to the geometry of the component, in particular by the thickness of the component. Flexible material means a material which can be used to form a flexible timepiece component, such as a spiral or a spring. The flexibility also depends on the geometry of the component and the stiffness to density ratio.

For some filling materials, for example a metal, the material has a high modulus of elasticity, greater than 100 Gpa, preferably greater than 200 GPa, and also has a high tensile strength, greater than 1 GPa, preferably greater than 2 GPa.

In other examples of filling materials, for example parylene, the material has a lower modulus of elasticity, comprised between 0.1 Mpa and 100 Gpa, and has a lower tensile strength, comprised between 200 MPa and 1 GPa.

The component is for example a spiral spring 6 of an oscillator mechanism 8 of a horological movement, or a spring 7 of a barrel 10 of a horological movement.

Examples of combinations of filler materials and nanowires with particularly advantageous properties will be mentioned.

A first example relates to copper nanowires and an alumina filling material (ruby, $Al_2O_3$), the copper allowing to evacuate the electrostatic charges, while keeping the properties of rigidity and high resistance of alumina for the component.

In a second example, the nanowires are made of metal and the filling material of Al$_2$O$_3$, the metal allowing to modify the colour of the component.

Silicon nanowires and a silicon oxide filler material allow the thermal dependence of elasticity to be modified, in particular to adjust the thermal compensation of the natural frequency of a mechanical oscillator.

Finally, a filling material made of parylene or another polymer (Teflon, POM, etc) allows a sliding component having a reduced coefficient of dry friction to be obtained, which is useful for some of the applications where the friction between two mobiles must be reduced, and/or the addition of a standard lubricant would only degrade friction and increase wear, for example in an anti-shock component.

Figure 2:
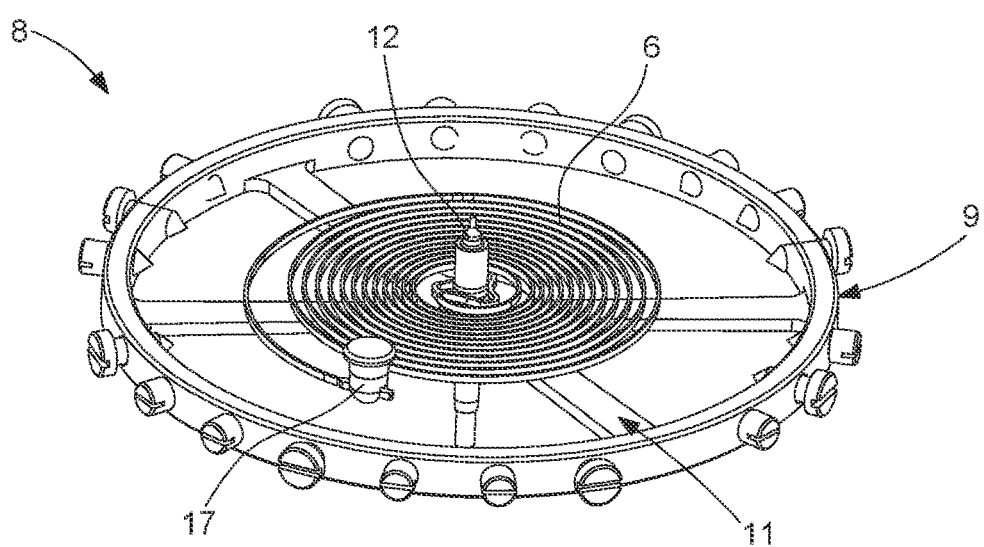
FIG. 2 shows a perspective view of a balance provided with a spiral spring of a mechanical oscillator mechanism, FIG. 3 schematically shows a perspective view of a barrel provided with a spring of a barrel.
Figure 3:
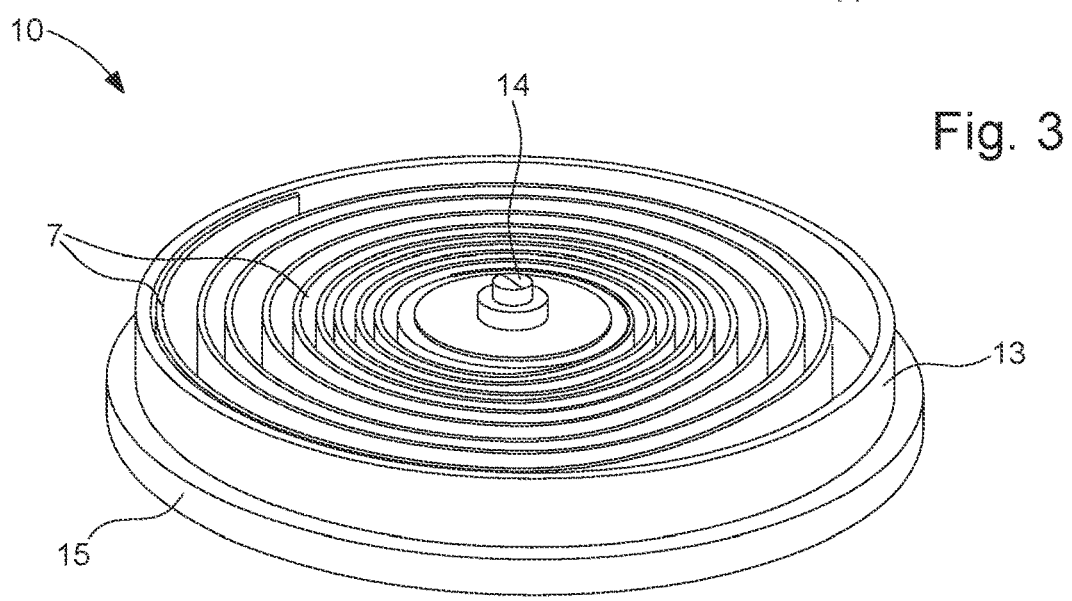

Depending on the combinations, the composite material allows in particular springs to be manufactured. FIGS. 2 and 3 are examples of such springs for watchmaking. Other components are also possible, such as anti-shock components, for example for a balance axis, or else a resonator element of a timepiece striking mechanism.

FIG. 2 shows a mechanical timepiece oscillator, including a spiral spring 6 and a balance 8. The spiral spring 6 is made of such a flexible composite material. The spiral spring 6 is a strip with a low width-to-height ratio, said strip is spirally wound so that there is a free space between the facing strip portions. Thus, the desired spring effect is obtained by contraction and deformation of the spiral. The balance 8 comprises a circular ring 9 and a rectilinear arm 11 passing through the centre of the ring 9 and connecting two opposite sides of the ring 9. The arm maintains an axis 12 substantially perpendicular to the plane of the ring 9. The axis 12 carries the spiral spring 6 in a plane parallel to that of the ring 9 by a first end. The second end is intended to be fixed to another fixed part 17 of the horological movement, called a balance-spring stud.

FIG. 3 shows a spring-barrel 10 formed of a barrel spring 7 made of such a flexible composite material as described above. The barrel 10 comprises a substantially flat circular case 13, provided with a gear tooth 15 on its external part, and with an axis 14 passing through the centre of the case 13 perpendicular to the plane of the case 13. The spring has the shape of a spiral substantially identical to that of the spiral spring described above for FIG. 2, but with different dimensions to fulfil its function of reserve and of supplier of mechanical energy to the horological movement. The spring 7 is arranged inside the case 13 by being fixed on the one hand to the axis 14 by one end, and to the inner peripheral edge of the case 13.

Regarding the manufacture of nanowires, conventional techniques related to the material selected from the list are used, such as catalytic growth, chemical etching, electrochemical deposition (electrodeposition), or deep etching by reactive plasma. The deposition of thin layers is preferably used, for example by CVD (Chemical Vapour Deposition) type chemical deposition or by PVD (Physical Vapour Deposition) type physical deposition. As in the first embodiment, photolithography methods are used to define the contours of the component on a substrate, for example made of silicon, where the nanowires are grown. After obtaining the nanowires, the flexible material is inserted between the nanowires. Finally, the component is detached from the substrate when it is finished.

International patent application WO 2014/172660 gives an embodiment of silica nanowires.

The nanowires 3 can also be produced by techniques other than catalytic growth, such as those described in the publication by N. Hutchison (MEMS 2009).

The filling material is inserted between the nanowires by methods of the ALD (atomic layer deposition), LPCVD (Low Pressure Chemical Vapour Deposition), MOCVD (moderate pressure CVD) type, by electrochemical deposition (electro-deposition), by CVD or by soaking in a liquid or gas phase.

Naturally, the invention is not limited to the embodiments described with reference to the figures and variants could be considered without departing from the scope of the invention.

The invention claimed is:

1. A flexible timepiece component for an oscillator mechanism or for a barrel of a horological movement, the component extending along a main plane and including at least a part made of a composite material, wherein the composite material comprises a matrix and a multitude of nanowires distributed in the matrix, the nanowires being juxtaposed, the matrix including a material for filling the interstices between the nanowires to join them to each other, each nanowire forming a solid one-piece tube, the nanowires being disposed substantially parallel to an axis substantially perpendicular to the main plane of the component.

2. The component according to claim 1, wherein the nanowires are made of an element to be selected from the following list: gold, palladium, silicon, diamond, boron nitride, gallium nitride, silicon nitride, zinc oxide, gallium arsenide, tungsten sulphide, silver, copper, manganese arsenide, indium arsenide, nickel, platinum, germanium, cobalt-graphene, phosphorus-germanium, copper-silver, gold-silver alloys, phosphorus-indium, nitrogen-gallium, nitrogen-indium-gallium, nitrogen-arsenic-gallium, arsenic-gallium, phosphorus-indium-gallium, sulphur-cadmium, sulphur-cadmium-selenium, nitrogen-aluminium-gallium, caesium-lead, antimony telluride, bismuth telluride, silicon oxide, titanium oxide, aluminium oxide, magnesium oxide, tungsten oxide, indium oxide, tin oxide, zinc oxide, lithium niobate, manganese oxide compounds, inorganic compounds of the Li$_2$Mo$_6$Se$_6$ or Mo$_6$S$_{9-x}$I$_x$ type, amorphous or partially amorphous metal alloys.

3. The component according to claim 1, wherein the nanowires have a diameter comprised within a range from 2 to 50 nm.

4. The component according to claim 1, wherein the nanowires have a length comprised within a range from 100 to 500 microns.

5. The component according to claim 1, wherein the filling material is produced from an element to be selected from the following list: tungsten, organic materials such as parylene, hexagonal boron nitride, poly-crystalline ruby of the Al$_2$O$_3$ type, poly-crystalline diamond, poly-crystalline silicon, tungsten or molybdenum disulphides, graphite, lead, silicon carbide, nickel, indium phosphide, titanium oxide, poly-silicone, amorphous carbon, amorphous carbon of the DLC (Diamond-like-carbon) type, hafnium oxide, silicon oxide, strontium titanate, zinc oxide, indium oxide, tungsten oxide, niobium oxide, cadmium oxide, magnesium fluoride, titanium nitride, silicon nitride, aluminium nitride, gallium nitride, hafnium nitride, calcium nitride, silver nitride, oxidised silicon nitride, platinum, palladium, molybdenum, tantalum, zinc sulphide, molybdenum sulphide, germanium, hydrofluorocarbon, compounds of the AlP, AlN, AlGaSb, AlGaAs, AlGaInP, AlGaN, AlGaP, GaSb, GaAsP, GaAs, GaN, GaP, InAlAs, InAlP, InSb, InGaSb, InGaN, GaInAlAs, GaInAlN, GaInAsN, GaInAsP, GaInAs, GaInP, InN, InP, InAs, InAsSb, ZnSe, HgCdTe, GeSbTe type.

6. The component according to claim 1, wherein the component is a spiral balance spring.

7. The component according to claim 1, wherein the component is a barrel spring.

8. A horological movement, comprising the flexible timepiece component according to claim 1.

9. The component according to claim 1, wherein the nanowires have a diameter comprised within a range from 3 to 15 nm.

10. The component according to claim 1, wherein the nanowires have a diameter comprised within a range from 5 to 10 nm.

11. The component according to claim 1, wherein the nanowires have a length comprised within a range from 100 to 300 microns.

12. The component according to claim 1, wherein the nanowires have a length comprised within a range from 150 to 200 microns.

* * * * *